Dec. 21, 1965 D. J. SANTELER 3,224,248
APPARATUS FOR PRESSURE MEASUREMENT IN VACUUM SYSTEMS
Filed Sept. 29, 1961 3 Sheets-Sheet 1

Inventor:
Donald J. Santeler,
by Paul G. Frank
His Attorney.

Dec. 21, 1965  D. J. SANTELER  3,224,248
APPARATUS FOR PRESSURE MEASUREMENT IN VACUUM SYSTEMS
Filed Sept. 29, 1961  3 Sheets-Sheet 2
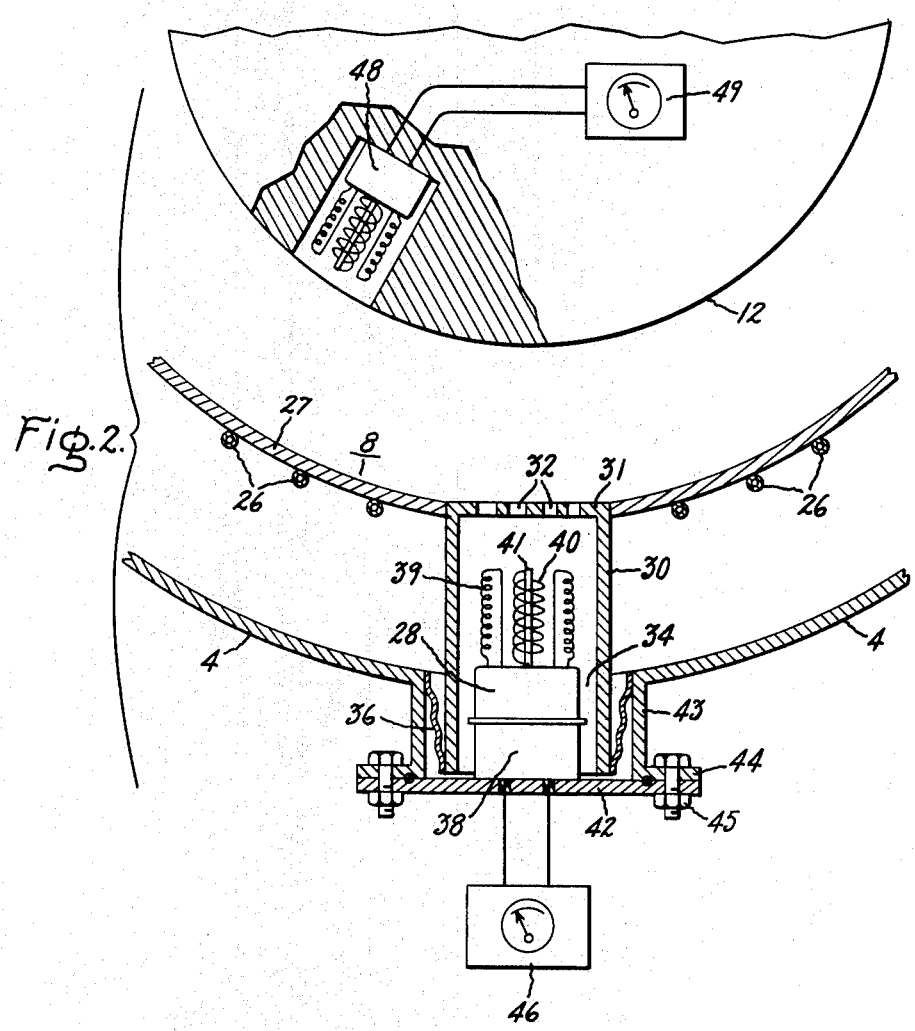
Inventor:
Donald J. Santeler,
by Paul A. Frank
His Attorney.

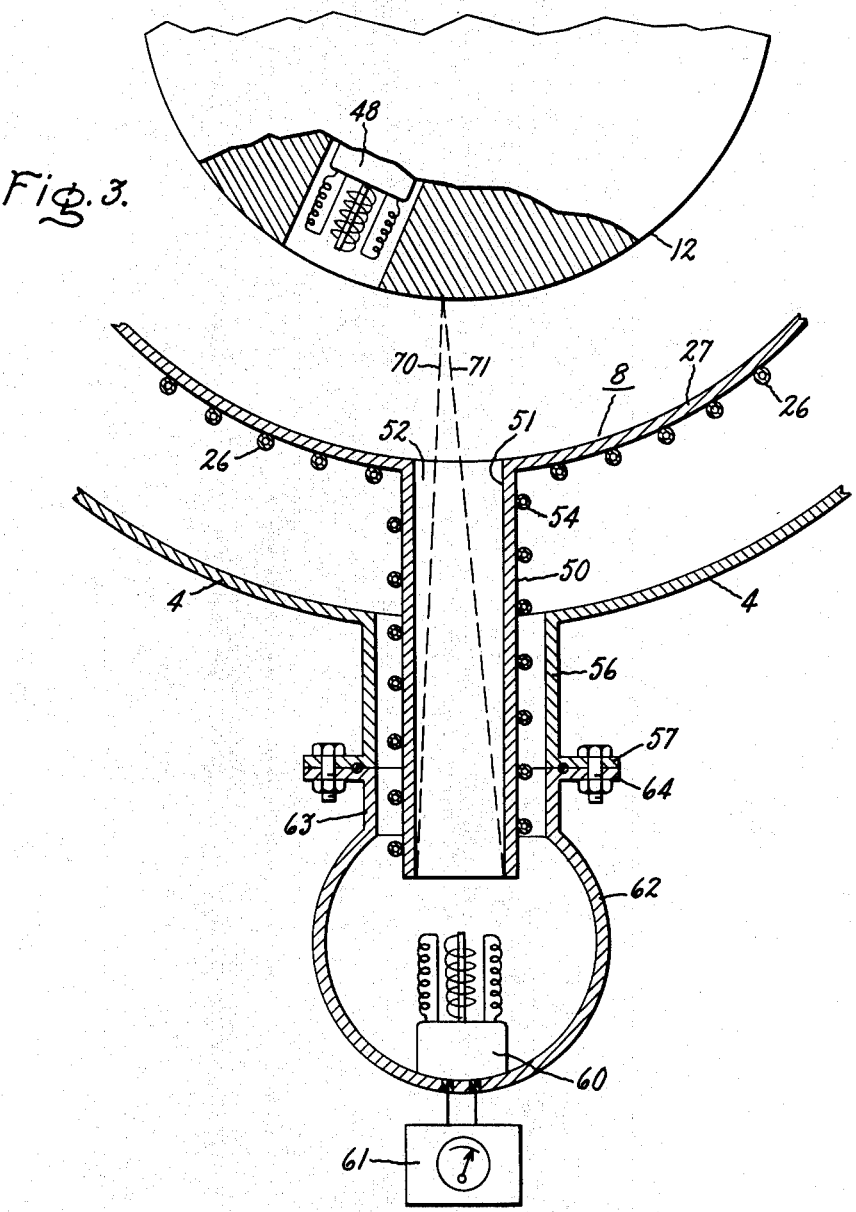

United States Patent Office 3,224,248
Patented Dec. 21, 1965

3,224,248
APPARATUS FOR PRESSURE MEASUREMENT
IN VACUUM SYSTEMS
Donald J. Santeler, Scotia, N.Y., assignor to General
Electric Company, a corporation of New York
Filed Sept. 29, 1961, Ser. No. 141,688
2 Claims. (Cl. 73—4)

The present invention relates to the measurement of pressures in vacuum systems and, more particularly, to the measurement of pressures in high pumping speed vacuum systems.

The usual approach to obtain very high vacuums is to initially outgas the entire system by increasing the temperature of portions thereof by a suitable bake-out procedure. Outgassing as used herein denotes the spontaneous release of gases when a material is exposed to different environmental conditions such as changes in pressure and temperature. In a bake-out procedure, the various gases residing on surfaces within the vacuum system may be dislodged and pumped from the system to permit attainment of very high vacuums with relatively small pumping speed. In a system containing a relatively small amount of pumping capacity, the residual gases remaining in the system may be considered as having a random directional pressure distribution.

The use of bake-out procedures to eliminate undesirable outgassing of a vacuum system is not possible in certain applications such as space simulators because of the nature of the particular test member undergoing observation. In these non-baked systems, very high vacuums may be achieved by the use of high speed pumping mechanisms such as cryogenic pumping panels wherein the gases are "pumped" by being condensed on low temperature surfaces located within the system. In the presence of high speed pumping mechanisms, the residual gases no longer have a random directional pressure distribution, but rather the gas flow and consequently the pressure distribution is highly directional toward the pumping means which are normally located on the walls of the vacuum system or space simulating chamber. In many instances, it is desirable to know the pressure or molecular incidence rate at the test member rather than at the chamber wall. It is not always possible or desirable to mount pressure measuring means on the test member, and hence, a chamber wall mounted measuring means must be used despite the known error due to the directional pressure effects noted above.

Generally, a hot cathode ionization gage is utilized to measure pressures in vacuum systems wherein the pressure is less than approximately $1 \times 10^{-4}$ millimeters of mercury. In many instances, the pressure measuring means (ion gage) is connected to the vacuum chamber by means of a tubulation. This tubulation must be of sufficient conductance for gas flow to provide accurate pressure measurement in the presence of the inherent pumping action of the pressure measuring means. Additionally, there is outgassing from the unbaked tubulation which will create a residual pressure in the vicinity of the pressure measuring means. Accordingly, in addition to the directional pressure effects of the gases in the system, there is also this further problem of the gage measuring the outgassing of the connecting tubulation.

The chief object of the present invention is to provide improved pressure measuring apparatus for use in high vacuum systems.

Another object of the invention is to provide an improved pressure measuring apparatus for use in high vacuum systems which is not harmfully affected by the outgassing of associated tubulation.

A further object of the invention is to provide an improved apparatus for meausring pressures in high vacuum systems wherein the pressure measured by the apparatus at the system wall is substantially the pressure condition at the test member.

A still further object of the invention is to provide a method for calibrating the pressure measuring means located at the vacuum system chamber wall to read the pressure existing at the test member.

These and other objects of my invention may be more readily perceived from the following description.

One of the features of my invention is a vacuum system including an evacuated chamber with pressure measuring means associated with the chamber through passage means. The pressure measuring means may be located adjacent pumping means such as a cryogenic pumping surface to pump molecules in a manner to compensate for the directional effects of the molecules in the chamber and also to prevent a measuring of outgassing molecules from the surfaces of the system adjacent the pressure measuring means. "Pumping" as used herein denotes the general removal of gases from an area and is intended to include the condensation of gases on refrigerated surfaces and also the sorption of gases by getters.

The attached drawings illustrate preferred embodiments of my invention, in which:

FIGURE 2 is a fragmentary sectional view of the simulating chamber shown in FIGURE 1 illustrating one embodiment of the invention; and FIGURE 3 is a fragmentary sectional view of another embodiment of the invention.

Figure 1:
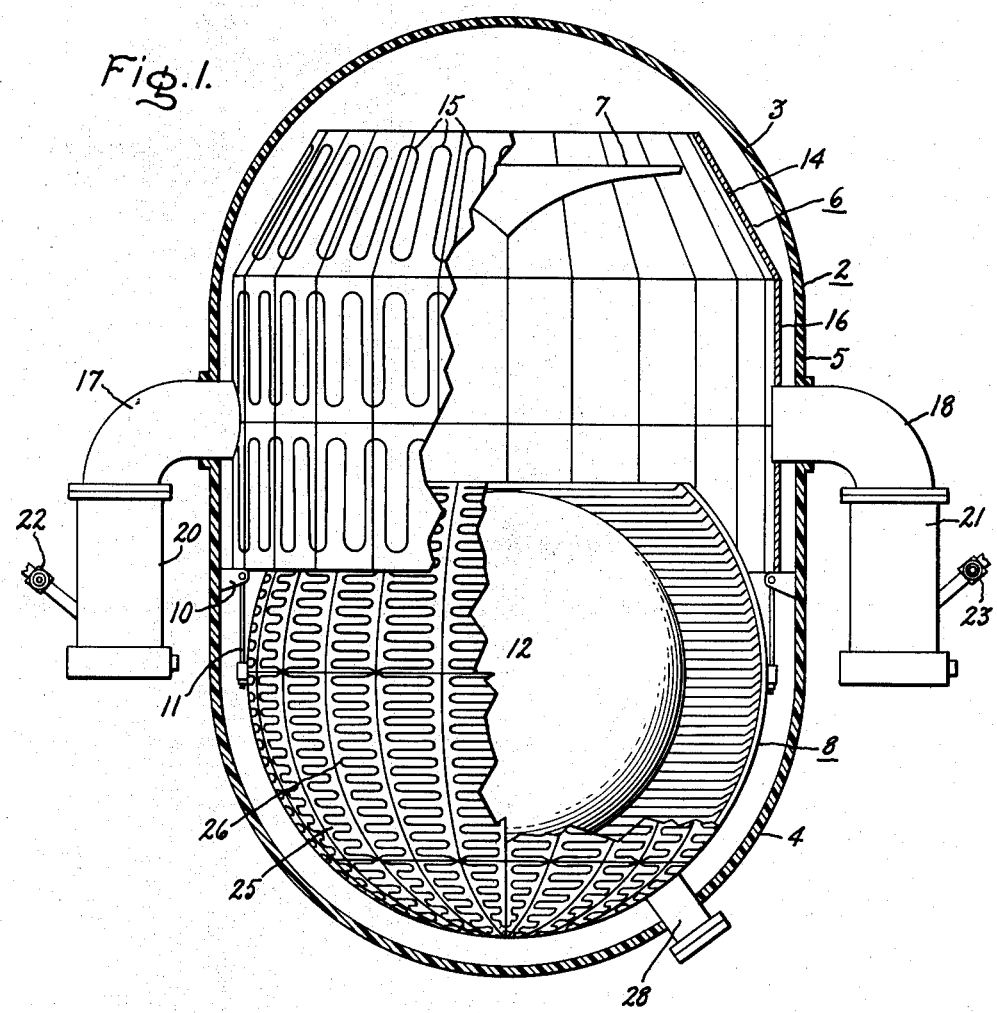
FIGURE 1 is a view in elevation, partially in section, illustrating a space simulating chamber employing the present invention.

In FIGURE 1 there is shown a space simulating chamber which may be of the type fully described in my copending application entitled, "Cryogenic Pumping Apparatus," Serial No. 59,642, filed September 30, 1960, now Patent No. 3,131,396, and assigned to the assignee of the present application. Space simulating chamber 2 may comprise an outer housing including an upper hemispherical shell member 3, a lower hemispherical shell member 4, and a central cylindrical shell member 5 which defines the evacuated chamber within which a test member 12 may be tested. Shield 6 may be located in the upper portion of the chamber to absorb radiant energy. A solar radiation source 7 may be also located in the upper portion of the chamber adjacent shield 6. A substantially spherical cryogenic member 8 may be mounted in the lower portion of the chamber. Shield 6 may be supported on a plurality of gusset plates 10 and spherical cryogenic member 8 may be supported by rods 11 extending from gusset plates 10.

The chamber may be evacuated by conventional mechanical, diffusion, and cryogenic pumping apparatus. Mechanical and diffusion pumps are located outside simulating chamber 2 and connected to the chamber by conduit elbows 17 and 18. Elbows 17 and 18 extend through cylindrical portion 5 of the housing and one end of each extends through radiant energy absorbing shield 6. The opposite ends of the elbows are connected to diffusion pumps 20 and 21 which are further connected to mechanical pumping means 22 and 23.

Located in the upper portion of chamber 2 is radiant energy absorbing shield 6 which comprises a frusto-conical portion 14 and a cylindrical portion 16. These portions may be fabricated of plate material and connected to form a structure which envelops light source 7 and a portion of the substantially spherical cryogenic member 8. Suitable heat exchange coils 15 may be thermally connected to the plates which comprise shield 6. A refrigerant such as liquid nitrogen may be circulated through coils 15 to refrigerate the plates.

In operating a space simulating chamber of the type described, it is desired that a temperature of approximately 100° K. or less be maintained within the space simulating chamber. This is readily achieved by the use of liquid nitrogen which may provide a shield temperature of approximately 77° K. (Kelvin). The function of the radiant energy absorbing shield 6 is to absorb photons in a manner that no randomly reflected energy in any uncontrolled manner passes into the lower portion of the chamber. For this reason, the plates are preferably fabricated to provide an energy pumping means of high absorbity. Gas molecules in the upper portion of the chamber striking shield 6 either condense and stay, condense and evaporate, or diffusely reflect essentially instantaneously, depending upon the species of the gases being condensed. Those gases not condensed, eventually make their way to either diffusion pumps or to a colder condensing surface.

Cryogenic pumping member 8 may comprise a plurality of panels 25 fabricated to form a substantially spherical enclosure having an opening through which the radiant energy from light source 7 may pass. A test member 12 may be mounted in the center portion of the cavity substantially defined by the cryogenic pumping member 8. Member 8 may be provided with suitable coils 26 through which a refrigerant such as nitrogen is passed. The nature of the inner surface of the cryogenic member is fully described in my previously identified copending application. It will be appreciated that other pumping panel configurations may be utilized while still practicing the present invention. Generally, the function of member 8 is to cryogenically pump gases and to absorb radiant energy. This function is performed by low temperature surfaces which are both molecularly "black" in that they condense the gases and also optically black to absorb radiant energy.

The low pressure within the space simulating chamber may be measured by gage 28 which is more fully described hereinafter. Gage 28 is connected by means of a suitable flange to a nozzle extending through the spherical wall portion 4 and is in communication with cryogenic member 8 so that the pressure may be measured.

It is customary in space simulating chamber and similar vacuum systems to provide a gage either in the chamber or in communication with the chamber. A gage at the chamber wall may fully read the directional characteristics of the pressure within the chamber. Clearly, when the pressure adjacent or at the surface of the test member is desired, this measured pressure may not be useful. In other constructions, a conduit or tube may extend into the chamber to place an ionization gage in communication with the chamber. Since the conduit usually is connected to the outer housing of the chamber, it may be at substantially the same temperature. Therefore, the conduit may be subject to substantial outgassing during operation in which event, the reading of the ionization gage is not truly the pressure within the chamber because the outgassing molecules are also being measured. In addition to outgassing molecules being measured, directional effects of the pumped gases may also be measured. The present invention provides a construction wherein the outgassing of tubulation such as conduits extending through the housing does not affect the measurement of the pressure within the chamber, and furthermore, means are provided to compensate for the directional characteristics of certain gases in the chamber so that the readings taken at the chamber walls may be substantially the pressure at the test member located in a central portion of the system.

In FIGURE 2 there is shown an enlarged fragmentary sectional view of the pressure measuring portion of the apparatus illustrated in FIGURE 1. In this view, cryogenic pumping member 8, which is located adjacent test member 12, comprises a wall portion 27 having coils 26 through which a refrigerant such as liquid nitrogen may be circulated. Because of the low temperature of wall 27, molecules being outgassed from the surface of the test member may be condensed thereon and radiant energy may also be absorbed by the surface. Spaced from member 8 is lower hemispherical member 4 which comprises a portion of the outer housing of simulating chamber 2. Cylindrical member 30 may extend from the cryogenic member 8 and may be thermally connected thereto so that the temperature of the cylindrical member is substantially the temperature of the refrigerant being supplied through coils 26. At one end of the passage defined by cylindrical member 30 may be located partition member 31 having a plurality of openings 32 which place the passage or chamber defined by cylindrical member 30 in communication with the simulating chamber and test member 12.

Cylindrical member 30 provides a housing for pressure measuring means 28; in the present embodiment, this means is a hot cathode ionization gage. The gage extends into chamber 34 defined partially by member 30 and may comprise a base member 38 from which extends a pair of filaments 39 located around a substantially helical grid 40 which further encircles a suitable plate 41. During the operation of this apparatus, the electrons emitted from the filaments are substantially collected on the grid whereas ion particles are collected on plate 41, the ions collected on plate 41 being an indication of the pressure in the chamber or more specifically in the area adjacent the measuring means. In order to measure the pressure, a suitably calibrated instrument 46 is connected to the pressure measuring means. In the present embodiment, instrument 46 may include a power supply, D.C. amplifier and a calibrated dial. In order to mount the pressure measuring means in the chamber, base 38 is mounted upon planar flange member 42 which is adapted to be connected to conduit 43 extending from hemispherical member 4. For the purpose of connection, conduit 43 is provided with flange 44 which mates with flange member 42 and is connected thereto by suitable bolts 45. To maintain the evacuated condition of the chamber, suitable sealing means such as O-rings may be provided between flange 44 and flange member 42. Recognizing that there may be a substantial amount of outgassing in the space between the cryogenic member 8 and the hemispherical member 4, it may be desirable to provide a barrier between the cylindrical member 30 and conduit 43. For this purpose, thermal gradient barrier 36 may be provided between these members. From the noted construction, it can be seen that the problem of out-gassing of tubulation substantially is avoided by the use of a chamber which has associated therewith pumping (refrigerated) surfaces. The low temperature of the surfaces adjacent the ion gage condenses most of the molecules and also substantially avoids emission of molecules therefrom.

To minimize the directional aspects of the particular gas being pumped within the chamber and hence to read the pressure at test member 12, openings 32 may be varied in size and number as may be the distance between the openings and the pressure measuring means 28 so that the number of molecules reaching the pressure measuring means is restricted to substantially avoid the directional character of the pumped gases.

The present invention provides pressure measuring means which recognizes the directional pressure characteristics of certain gases being pumped and further recognizes that unpumped tubulation or surfaces adjacent the pressure measuring means may influence the pressure being measured. If connecting openings are placed between the simulating chamber and the chamber housing of the pressure measuring means, molecules may migrate freely between the chambers in both directions. By providing pumping means, for example, cryogenic pumping surfaces, with the chamber housing of the pressure measuring means, the pressure in this second chamber may be reduced below that of the main chamber by the provision of additional "exit" means for molecules from the second chamber (by being condensed and retained on the surfaces.) Recognizing that the relationship between the pressures in the two chambers is determined by the conductance (area) of the connecting openings and the amount of pumping capacity (in this embodiment cryogenic condensing surfaces) in the chamber containing the pressure measuring means, it is apparent that any desired pressure relationship may be obtained by judiciously selecting the cross-sectional area of the openings and/or the amount of pumping means. Hence, by proper selection, the pressure sensed by the measuring means may be controlled to measure the pressure conditions at the test member.

It is recognized herein that there may be different directional pressure effects for different types of gas due to differences in the pumping means. For example, the temperature of the cryogenic panels determines the nature of gases being pumped and also the directional characteristics of such gases. The selective characteristics of the pumping means, specifically the temperatures of the cryogenic pumping members may be utilized to measure simultaneously the pressures of different types of gas by providing specific amounts of different temperature surfaces within the chamber containing the pressure measuring means. It will be appreciated that gases substantially not pumped in the main chamber and hence, not having a directional pressure effect are not pumped in the chamber containing the pressure measuring means. These gases are directly measured without any unnecessary compensating effects.

In the embodiment in FIGURE 2 there is shown a test member which includes a second pressure measuring means 48 associated with suitable instrumentation 49. This pressure measuring system may be of the type utilized at the chamber wall. As previously mentioned, there is shown a need to determine the size of opening 32 associated with pressure measuring means 28 so that the number of molecules being measured by pressure measuring means 28 is substantially the number of molecules which will be measured at the surface of the test member. For this purpose, pressure measuring means 48 having suitable instrumentation 49 may be provided on the test member and by suitably varying the size and number of openings 32, the number of molecules reaching pressure measuring means 28 may be made substantially the number being measured by pressure measuring means 48. By this procedure, the measuring instrument at the chamber wall may be calibrated to indicate the pressure sensed at the test member.

In the embodiment of the invention shown in FIGURE 3, the orientation of member 12, cryogenic member 8, and outer housing wall 4 are substantially as shown in FIGURE 2. There is also an opening in the cryogenic member 8 from which extends passage 52 being substantially defined by cylindrical member 50 having inner walls 51. Walls 51 may, if desired, be refrigerated by suitable coils 54 operatively associated with coils 26 through which a refrigerant such as liquid nitrogen may be circulated. From lower hemispherical member 4 may extend cylindrical member 56 having a flange 57 which is adapted to be connected to the pressure measuring means which in the present embodiment comprises ionization gage 60 associated with a suitable instrumentation 61. The ionization gage may be located in a substantially spherical member 62 having a tubular portion 63 terminating at a flange 64, flanges 57 and 64 being adapted to be connected by bolts. Preferably, there should be sealing means such as O-rings located between the flanges. Cylindrical member 50 may extend into the chamber defined by spherical member 62. In the present embodiment, for reasons to be more fully understood hereinafter, the diameter of the cylindrical member 50 and its particular length is determined by considerations which depend upon the particular test member and the associated main chamber as defined by cryogenic member 8.

In the apparatus shown in FIGURE 3, the tubulation defined by cylindrical member 56 normally outgases because it is substantially at ambient temperature. By utilization of refrigerated cylindrical member 50, the outgassing effect of the inner surface of member 56 is not substantially detected by the ion gage. Furthermore, the outer surface of cylindrical member 50 is utilized for cryogenically pumping gas molecules.

With respect to the problem of accommodating the directional effects of the gases being emitted by the member 12, in this particular embodiment the operation is slightly different from that outlined with respect to the apparatus in FIGURE 2. The length and diameter of the refrigerated tubulation in this particular embodiment is adjusted so that the transmission of molecules directly through passage 52 is substantially equal to the percent of non-pumping wall area (non-refrigerated) in the main chamber. The result is achieved by the adjustment of the length and diameter of passage 52. The fraction of condensible molecules transmitted to the gage is equal substantially to the fraction of condensible molecules which are reflected from the walls adjacent the test member. The pumping action of the refrigerated passage on non-condensible gases is substantially the same as in the main chamber. Hence, the gage reads the total non-condensible gases plus the amount of condensible gases which are not restricted by the geometry of the refrigerated tube. This restriction may be shown by lines of sight 70 and 71 which originate at a point or area on the surface of the test member and which determine the unobstructed path of molecules passing to measuring means 60.

If desired, ionization gage 60 may be calibrated against a gage mounted on the test member similar to the ionization gage 48 illustrated in FIGURE 2. The calibration process described with respect to the apparatus in FIGURE 2 may also be utilized with this embodiment.

The present invention provides an improved construction for measuring the pressures within a vacuum system such as a space simulating chamber wherein the condensible gases being pumped have high directional characteristics which under certain circumstances give pressure readings at the chamber surfaces which differ from the pressure conditions at the test member centrally located within the system. Furthermore, the present invention also avoids the problem of outgassing effects with connecting tubulation associated with the pressure gage. While the invention has been described utilizing cryogenic pumping means, it will be appreciated that other pumping means such as getter devices may be used to practice the invention.

While I have described preferred embodiments of my invention, it will be understood that my invention is not limited thereto since it may be otherwise embodied within the scope of the appended claims.

What I claim as new and desire to secure by Letters Patent of the United States is:

1. In a vacuum system, the combination of means defining a first chamber adapted to have a test member mounted therein a cryogenic pumping means positioned in said first chamber, means defining a second chamber, pressure measuring means located in said second chamber, wall means separating the first and second chambers, said wall means having openings placing said chambers in communication and a refrigerated surface located in said second chamber proximate to said pressure measuring means.

2. In a vacuum system the combination of wall means defining a chamber having an aperture therein, which chamber is adapted to have a test member positioned therein, a cryogenic pumping means located within said chamber, pressure measuring means in communication with the aperture and refrigeration means proximate said pressure measuring means.

References Cited by the Examiner
UNITED STATES PATENTS

| | | | |
|---|---|---|---|
| 2,374,232 | 4/1945 | Pfeiffer et al. | 62—269 X |
| 2,542,355 | 2/1951 | Postlewaite | 73—4 |
| 2,576,687 | 11/1951 | Krehbiel | 73—389 |
| 2,806,377 | 9/1957 | Herman | 73—389 |
| 2,970,467 | 2/1961 | Pettibone | 73—4 |

ISAAC LISANN, *Primary Examiner.*

LOUIS R. PRINCE, SAMUEL S. MATTHEWS,
*Examiners.*